United States Patent [19]

Dünwald

[11] 4,444,845

[45] Apr. 24, 1984

[54] PROCESS FOR THE PRODUCTION OF COATINGS AND THE USE OF N,N',N''-TRIS-(2-HYDROXYETHYL)-ISOCYANURATE AS ADDITIVES FOR POLYURETHANE BASED WIRE LACQUERS

[75] Inventor: Willi Dünwald, Leverkusen, Fed. Rep. of Germany

[73] Assignee: Bayer Aktiengesellschaft, Leverkusen, Fed. Rep. of Germany

[21] Appl. No.: 407,866

[22] Filed: Aug. 13, 1982

[30] Foreign Application Priority Data

Aug. 25, 1981 [DE] Fed. Rep. of Germany ....... 3133571

[51] Int. Cl.$^3$ .......................... B32B 27/00; B05D 3/02
[52] U.S. Cl. .............................. 428/422.8; 427/385.5; 427/388.2; 427/389.7; 427/389.8; 428/375; 428/378; 428/379; 428/388; 428/457
[58] Field of Search .............. 427/385.5, 393.5, 388.2, 427/388.1, 393.6, 389.7, 389.8; 428/422.8, 457, 379, 375, 378, 388

[56] References Cited

U.S. PATENT DOCUMENTS

| | | | |
|---|---|---|---|
| 4,096,291 | 6/1978 | Dunwald et al. | 427/120 |
| 4,100,144 | 7/1978 | Dunwald et al. | 260/860 |
| 4,239,814 | 12/1980 | Nagel | 427/120 |

FOREIGN PATENT DOCUMENTS 1195886  6/1967  United Kingdom .
1490635 11/1977  United Kingdom .

*Primary Examiner*—Thurman K. Page
*Attorney, Agent, or Firm*—Gene Harsh; Joseph C. Gil; Thomas W. Roy

[57] ABSTRACT

This invention relates to a new process for the production of coatings by coating heat-resistant substrates with a coating compound in which the binder is a two-component system containing polyisocyanates having at least partially blocked isocyanate groups and compounds containing isocyanate reactive groups and optionally further auxiliary agents and additives, the two-component system being one in which from about 0.1 to 60 equivalent % of the component containing isocyanate reactive groups consists of N,N',N''-tris-(2-hydroxyethyl)-isocyanurate, and to the coated substrate produced therefrom.

10 Claims, No Drawings

PROCESS FOR THE PRODUCTION OF COATINGS AND THE USE OF N,N',N''-TRIS-(2-HYDROXYETHYL)-ISOCYANURATE AS ADDITIVES FOR POLYURETHANE BASED WIRE LACQUERS

BACKGROUND OF THE INVENTION

1. Field of the Invention

This invention relates to an improved process for the production of coatings on heat-resistant substrates, in particular metal wires, using stoving lacquers based on polyisocyanates having at least partially blocked isocyanate groups and compounds having isocyanate reactive groups, which lacquers contain N,N',N''-tris-(2-hydroxyethyl)-isocyanurate as additive, and the use of the said compound as additive in such lacquers.

2. Description of the Prior Art

It is already known to coat heat-resistant substrates using coating compounds based on combinations of organic polyisocyanates having at least partially blocked isocyanate groups and compounds having isocyanate reactive groups.

These processes known in the art are suitable in particular for wire lacquering (see e.g., German Ausleges-chrift No. 1,644,794, German Offenlegungsschriften Nos. 2,404,739 and 2,404,740, German Auslegeschrift No. 2,626,175 or German Offenlegungsschrift No. 2,840,352). In the coating compounds used in these known art processes, the polyisocyanate component preferably consists exclusively of completely blocked polyisocyanates. The coating compounds are therefore stable in storage below 80° C. and hardening is carried out only after the coating process has been completed, by heating the coating to temperatures above 80° C. so that the blocking agent is split off.

This cross-linking by heat is accompanied by several processes. The solvent usually present evaporates and at the same time the binder components undergo a sharp drop in viscosity due to the rise in temperature before the cross-linking reaction takes place with release and evaporation of the blocking agent.

In order to obtain the best surface characteristics for the hardened film, it is very important that the events described above should take place in the optimum sequence. Thus, for example, extensive hardening before the solvent evaporates results in the formation of craters. On the other hand, cross-linking should not take place too late because otherwise the binder, which is highly fluid at high temperatures, alters its distribution over the substrate, for example due to gravity or surface tension, before it has become fixed on the substrate by hardening.

In view of the complexities regarding the events of film formation, it is extremely difficult to find measures which enable processing to be carried out more rapidly. The choice of low boiling solvents and hence more rapid spread of the increase of temperature throughout the binder in most cases results in lacquer films with unsatisfactory surface characteristics. The same difficulty is also encountered if the specific catalysis of urethane formation is too vehement.

It has now surprisingly been found that the addition of N,N',N''-tris-(2-hydroxyethyl)-isocyanurate (THEIC) to coating compounds, i.e. the addition of THEIC as a binder component, results in a very substantial improvement in the processing characteristics of the coating substance. The addition of this compound in particular enables the speed of transport of metal wires through the usual apparatus used for wire lacquering to be substantially increased without the quality of the lacquering obtained being in any way deleteriously affected.

SUMMARY OF THE INVENTION

The present invention relates to a process for the production of a coating by coating a heat resistant substrate with a coating compound containing, as binder, a two-component system comprising (i) a polyisocyanate component having at least partially blocked isocyanate groups and (ii) a component comprising compounds having isocyanate reactive groups, and hardening of the resulting coating at elevated temperatures, characterized in that binder component (ii) comprises from about 0.1 to 60 equivalent percent, based on all the groups capable of undergoing addition reactions with isocyanate groups, of N,N',N''-tris-(2-hydroxyethyl)-isocyanurate.

The present invention also relates to the coated substrates produced from the above process and to the use of N,N',N''-tris-(2-hydroxyethyl)-isocyanurate as an additive for improving the processing characteristics in a wire lacquer in which the binder comprises a combination of (i) a polyisocyanate component having at least partially blocked isocyanate groups and (ii) compounds containing at least two isocyanate reactive groups.

The coating compounds used in the process according to the invention and in the use according to the invention contain a two-component system of the above-mentioned type as binder in addition to optional auxiliary agents and additives conventionally used in lacquer technology.

DETAILED DESCRIPTION OF THE INVENTION

The polyisocyanate components (i) are any at least partially blocked polyisocyanates or polyisocyanate mixtures of the type known in polyurethane chemistry. Suitable polyisocyanates include, for example, aliphatic, cycloaliphatic, araliphatic, aromatic and heterocyclic polyisocyanates such as, for example, hexamethylene diisocyanate, dodecamethylene diisocyanate, cyclohexane-1,3- and -1,4-diisocyanate and any mixtures of these isomers, 1-isocyanato-3,3,5-trimethyl-5-isocyanatomethyl-cyclohexane, 2,4- and 2,6-hexahydrotolylene diisocyanate and any mixtures of these isomers, 1,3- and 1,4-phenylene diisocyanate, 2,4- and 2,6-tolylene diisocyanate and any mixtures of these isomers, diphenylmethane-2,4'- and/or 4,4'-diisocyanate, polyphenylpolymethylene polyisocyanates such as those obtained by aniline-formaldehyde condensation followed by phosgenation, which have been described, for example, in British Pat. Nos. 874,430 and 848,671, polyisocyanates containing allophanate groups as described e.g., in British Pat. No. 994,890, polyisocyanates containing isocyanurate groups as described e.g., in German Patent Specification Nos. 1,022,789, 1,222,067 and 1,027,394 and in German Offenlegungsschriften Nos. 1,929,034 and 2,004,048, polyisocyanates containing urethane groups as described e.g., in Belgian Pat. No. 752,261 or in U.S. Pat. No. 3,394,164, polyisocyanates containing carbodiimide groups as described e.g. in German Pat. No. 1,092,007, and polyisocyanates containing biuret groups as described e.g. in German Pat.

No. 1,101,394, British Pat. No. 889,050 and French Pat. No. 7,017,514. Modified polyisocyanates of the type described in German Auslegeschrift No. 1,266,427 in their at least partially blocked form may also be used according to the invention. Any mixtures of the above-mentioned polyisocyanates may also be used.

Polyisocyanates in the molecular weight range of about 174 to 1000 (not including the weight of the blocking agent) which are at least partially blocked and contain aromatically bound isocyanate groups are particularly preferred, such as in particular, 2,4-diisocyanatotoluene, 2,6-diisocyanatotoluene, commercial mixtures of the said isomers, 4,4'-diisocyanatodiphenylmethane, 4,4'-diisocyanatodiphenyl-dimethylmethane, 1,5-diisocyanatonaphthalene, homologous or isomeric mixtures such as may be obtained in known manner by the phosgenation of aniline/formaldehyde condensates; polyisocyanates containing urethane groups obtainable in known manner by the reaction of excess quantities of simple diisocyanates of the last-mentioned type exemplified above, in particular of 2,4-diisocyanato toluene, with aliphatic, polyhydric alcohols in the molecular weight range of from about 62 to 200, in particular trimethylolpropane, followed by removal of the unreacted diisocyanate excess by distillation; polyisocyanate containing urethane groups which are prepared in analogous manner but using THEIC as polyhydric alcohol; polyisocyanates containing isocyanurate groups, obtainable by the trimerization of a portion of the isocyanate groups in the diisocyanates exemplified above, in particular of 2,4-diisocyanato toluene; and oligohydantoines containing isocyanate groups obtainable according to British Pat. No. 1,195,938.

The isocyanate groups in polyisocyanate component (i) used according to the invention are at least partially blocked. This means that at least about 50%, preferably at least about 80% and most preferably 100% of the isocyanate groups are blocked with blocking agents. Known blocking agents are suitable for this purpose, e.g. phenol, cresol, ε-caprolactam, diethylmalonate, ethyl acetoacetate, cyclohexanone oxime, methanol, n-butanol and cyclohexanol. Phenols, e.g. phenol and the isomeric cresols, are particularly preferred. Suitable blocking agents have been disclosed, for example, in the publications mentioned above in the Description of the Prior Art.

Binder component (ii) is composed of THEIC and at least one other compound containing isocyanate-reactive hydrogen atoms. These compounds containing isocyanate reactive hydrogen atoms include, in particular, relatively high molecular weight (i.e., molecular weight e.g., about 200 to 2000) polyhydroxy polyesters with aliphatically bound hydroxyl groups of the type known in polyurethane chemistry, which are advantageously obtained from dicarboxylic acids such as phthalic acid, isophthalic acid, terephthalic acid, their nuclear hydrogenation products and adipic acid with excess quantities of diols. If a certain degree of branching is desired, it is also possible to use tri-functional or higher-functional alcohols. Examples of diols and tri-functional and higher-functional alcohols suitable for the preparation of the polyester polyols include ethylene glycol, 1,2-propanediol, 1,3-propanediol, 1,4-butanediol, 1,2-butanediol, 1,2-pentanediol, 1,6-hexanediol, diethylene glycol, triethylene glycol, tetraethylene glycol, polyethylene glycols, dipropylene glycol, tripropylene glycol, tetrapropylene glycol, glycerol, hexanetriol, trimethylolpropane, trimethylolethane, pentaerythritol, 4,4'-bis-(2-hydroxyethyl)-diphenylpropane-(2,2), quinitol, maleic acid-bis-ethylene glycol ester, adipic acid-bis-ethylene glycol ester, benzene-dicarboxylic acid-bis-ethylene glycol ester and THEIC.

Oligourethanes in the molecular weight range of from about 200 to 2000 containing aliphatically bound hydroxyl groups, for example of the type described in German Pat. No. 1,644,794 or British Pat. No. 1,195,886, are also particularly suitable components (ii). These polyhydroxy-oligourethanes may easily be prepared by a reaction of the last-mentioned diols and/or polyols with subequivalent quantities of diisocyanates of the type exemplified.

Apart from such hydroxyl compounds as reactants (ii) for the polyisocyanate component (i), hydroxyl group-containing epoxides, imide esters, imidoester amides, hydantoins, acrylates and polyvinyl acetals are also suitable according to the invention.

Component (ii) according to the invention is composed of from about 0.1 to 60 equivalent percent, preferably from about 2 to 30 equivalent percent of free (i.e. not chemically built into any other starting material) THEIC with the remainder being at least one of the compounds exemplified above which contain isocyanate reactive hydrogen atoms.

The two-component system consisting of components (i) and (ii) contains the two components in such proportions that the equivalent ratio of (at least partially blocked isocyanate groups): (isocyanate reactive groups) is in the range of from about 0.1:1 to 2.8:1, preferably from about 0.5:1 to 1.9:1, and in particular from about 0.8:1 to 1.6:1.

When an excess of (at least partially blocked) isocyanate groups is used, they may react, for example, with the active hydrogen atoms of urethane bonds to result in cross-linking of the polyurethane formed. This frequently leads to an increase in the hardness of the surfaces obtained by the process according to the invention, which may be desirable. Excess isocyanate groups may, of course, also react with each other, for example to form isocyanurates, and such reactions may also result in a desirable increase in the hardness of the surface structures. The use of excess quantities of compounds containing isocyanate reactive groups may result in an increase in the flexibility of the surface structures obtained by the process according to the invention, an increase which may also be desirable. If a large excess of polyester polyols within the ranges mentioned above is used, it is frequently advisable also to use an esterification catalyst, such as titanium tetrabutylate, for example, so that additional cross-linking of the binder is achieved by ester interchange reactions. The binders containing components (i) and (ii) generally contain from about 1 to 10% by weight, preferably from about 4 to 10% by weight of free THEIC, based on the weight of the binder.

Apart from the binder which contains components (i) and (ii), the coating compound to be used according to the invention may contain additional auxiliary agents and additives known in lacquer technology.

These include, for example, catalysts for increasing the cross-linking reaction, such as those described, for example, in German Auslegeschrift No. 2,626,175 at column 7, line 35 and column 8, line 27, and other basic compounds, e.g. aldimines based on aliphatic aldehydes and aromatic amines. These catalysts are generally used in a quantity of from about 0.01 to 5.0% by weight, preferably from about 0.1 to 1.0% by weight, based on the polyisocyanate component. The usual additives used in lacquer technology, e.g. pigments and fillers, may also be included.

Depending on the nature of the binder components (i) and (ii), it may be advisable to apply the coatings solvent-free or from solution.

The solvents used may be those conventionally used for the preparation of wire lacquers, such as phenol, cresol and/or xylenol, or those commonly used in polyurethane lacquers, e.g. methyl ethyl ketone, methyl isobutyl ketone or butyl acetate or monohydric alcohols optionally containing ether oxygen atoms, e.g. cyclohexanol, diethylene glycol monomethyl ether or diethylene glycol monoethyl ether or any mixtures of such solvents. Suitable diluents may, of course, also be added, e.g. toluene, xylene, or higher boiling aromatic hydrocarbon mixtures. If the coating compounds used according to the invention are in the form of solutions, they are generally solutions with a solid content of from about 15 to 75% by weight, preferably from about 20 to 55% by weight.

The coating compound to be used in the process according to the invention may also contain other additives, e.g. pigments and fillers.

The process according to the invention may be used in particular for the formation of temperature resistant coatings on metals, ceramics or glass fibers or glass fiber fabrics. The coating compounds to be used according to the invention may be applied by any methods known in lacquer technology, e.g. immersion, spraying or spread coating. After application of the lacquers, the coated substrates are subjected to elevated temperatures, preferably in stoving ovens, to effect the final cross-linking of the coating. These temperatures are generally above 80° C., preferably from about 180° to 700° C. and most preferably from about 250° to 500° C.

A particularly preferred field of application of the process according to the invention is the lacquering of wires by the known methods of immersion coating, roller application or the suction felt process with stripper nozzles or felts arranged behind the applicators.

In the following examples, all the percentages given are percentages by weight.

EXAMPLES

Example 1

100 parts of a polyester of 1.6 mole of dimethyl terephthalate, 1.2 mol of ethylene glycol and 0.8 mol of a glycerol having an OH content of about 6%; and 200 parts by weight of an adduct of 1 mol of trimethylol propane, 3 mol of tolylene diisocyanate and 3 mol of phenol, containing 13.4% of phenol blocked isocyanate groups (molecular weight 42) are dissolved in a solvent mixture of equal parts of cresol and xylene to produce a lacquer having a solid content of 25%.

1% of an aldimine based on alkyl substituted acrolein and aniline, based on the solid content, is added as accelerator.

A copper wire 0.1 mm in diameter is lacquered in a horizontal wire lacquering installation 2.40 m in length in which the solvent is burnt off catalytically. The temperatures are adjusted as follows:
First half of shaft 450° C.
Second half of shaft 500° C.

A perfect surface of lacquered wire may be obtained with rates of transport of the wire of up to 280 m/min.

Further increase of the velocity is not possible without production of an unsatisfactory surface.

If, however, 10% of THEIC, calculated on the solid content is added to this lacquer, the draw-off rate may be increased to 380 m/min.

Example 2

200 parts by weight of an adduct of 1 mol of trimethylolpropane, 3 mol of tolylene diisocyanate and 3 mol of phenol as in Example 1 and 100 parts by weight of the polyester of Example 1 are dissolved in a solvent mixture of equal parts of cresol and xylene to produce a lacquer with a solid content of 40%.

This lacquer is used to coat a copper wire 0.7 mm in diameter in a vertical wire lacquering installation.
Length of oven: 4 m
Shaft temperature: 320° C.
Nozzle stripper: 6 passages In this case, with a flawless surface on the lacquered wire, the softening temperature corresponding to DIN 46 453 10.2 is used as criterion for the degree of cross-linking achieved.

The softening temperature is in the range of from 240° to 250° C. when the lacquer draw-off speeds are 7, 8, 9 and 10 m/min, and it falls to 200° C. and lower at draw-off speeds above 10 m/min.

If 7.5% of THEIC, based on the solid content, is added to the lacquer, the draw-off rate of the copper wire may be increased to 13 to 14 m/min. The lowering in softening temperature does not occur until draw-off rates above 14 m/min are reached.

Example 3

200 parts by weight of an adduct prepared according to German Auslegeschrift No. 2,626,275 from 825 g of benzyl alcohol, 600 g of trimethylolpropane and 2625 g of 4,4'-diisocyanatodiphenylmethane containing 7.5% of isocyanate groups blocked with benzyl alcohol (molecular weight 42) and 100 parts by weight of the polyester of Example 1 are dissolved in a solvent mixture of equal parts of cresol and xylene to produce a lacquer having a solid content of 27%.

2%, based on the solid content, of lead octoate containing 24% Pb and 1% Zn octoate containing 8% Zn are added.

In the lacquering experiment described in Example 1, this mixture can only produce satisfactory lacquer wires at a speed of 250 m/min.

When 7% of THEIC is added, the permissible speed is increased to 350 m/min.

Example 4

230 parts by weight of the blocked polyisocyanate of Example 3 and 100 parts by weight of a hydroxyurethane of 1 mol of diethylene glycol, 1 mol of trimethylolpropane and 1.5 mol of 4,4-diisocyanatodiphenylmethane with a hydroxyl content of 5% are dissolved in a solvent mixture of equal parts of diethylene glycol-monomethyl ether and diethylene glycol-monoethyl ester to produce a lacquer having a solid content of 25%.

2%, based on the solid content, of a lead octoate containing 25% of lead, and 1%, based on the solid content, of a zinc octoate containing 8% of zinc are added. The draw-off rate which can be achieved in the lacquering experiment of Example 1 is 240 m/min.

After the addition of 5% THEIC (based on the solid content), the draw-off rate may be increased to 300 m/min.

Example 5

220 parts by weight of the blocked polyisocyanate prepared according to Example 3 and 100 parts by weight of a polyester of 2 mol of trimethylolpropane, 1.5 mol of ethylene glycol and 2 mol of phthalic acid anhydride having a hydroxyl content of about 12% are dissolved in a solvent mixture similar to that of Example 4. Solid content 40%. 2% lead octoate and 1% zinc octoate, based on the solid content, are added.

The draw-off rate obtainable is 230 m/min.

The addition of 6% THEIC, based on the solid content, increases the possible draw-off rate to 290 to 300 m/min.

Example 6

100 parts by weight of the polyester of Example 1 and 50 parts by weight of an oligohydantoin containing 1.7% of cresol-blocked isocyanate groups (molecular weight 42) and prepared according to British Pat. No. 1,195,938 from 1 mol of N,N'-bis-(methoxycarbonyl-dimethyl-methyl)-4,4'-diaminodiphenylmethane and 1.3 mol of 4,4'-diisocyanatodiphenylmethane are dissolved in a solvent mixture of equal parts of cresol and xylene to produce a lacquer having a solid content of 40%. 1.5%, based on the solid content, of a polymeric butyl titanate are added.

This lacquer is used to coat a copper wire 0.7 mm in diameter as described in Example 2.

At a lacquering speed of more than 9 m/min, the softening temperature falls to values below 270° C.

If in addition 8% THEIC, based on the solid content, is added to the lacquer, the softening temperature remains above 270° C. even at a lacquer draw-off rate of 13 m/min.

Example 7

100 parts by weight of an adduct of 1 mol THEIC, 3 mol of 4,4'-diisocyanatodiphenylmethane and 3 mol of phenol, containing 9.7% of phenol-blocked isocyanate groups (molecular weight 42) and 100 parts by weight of a hydroxyurethane of 1 mol of diethylene glycol, 1 mol THEIC and 1.5 mol of 4,4'-diisocyanatodiphenylmethane with an OH content of 4.6% are dissolved in a solvent mixture of equal parts of cresol and naphtha solvent to produce a lacquer having a solid content of 30%. 2%, based on the solid content, of lead octoate is added.

A lacquering speed of 280 m/min is achieved in the lacquering experiment of Example 1.

If an additional 4% THEIC, based on the solid content, is added, this speed is increased to 330 m/min.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a coating which comprises coating a heat-resistant substrate with a coating compound in which the binder is a two-component system comprising
    (i) a polyisocyanate component wherein at least about 50% of the isocyanate groups are blocked with blocking agents and
    (ii) a component mixture comprising compounds having isocyanate reactive groups, at an equivalent ratio of blocked and unblocked isocyanate groups to isocyanate reactive groups of about 0.1:1 to 2.8:1, and hardening the resulting coating at elevated temperatures, characterized in that binder component (ii) contains about 0.1 to 60 equivalent percent, based on all the groups capable of undergoing an addition reaction with isocyanate groups, of N,N',N''-tris-(2-hydroxyethyl)-isocyanurate.

2. The process according to claim 1, wherein polyisocyanate component (i) comprises an organic polyisocyanate in the molecular weight range of from about 174 to 1000, not including the molecular weight of the blocking agent, and wherein the isocyanate groups are exclusively aromatically-bound and completely blocked with blocking agents for isocyanate groups.

3. The process according to claim 1 or 2, wherein binder component (ii) consists essentially of polyester polyols in the molecular weight range of from about 200 to 2000 containing at least two aliphatically-bound hydroxyl groups and/or oligourethanes in the molecular weight range of from about 200 to 2000 containing at least two aliphatically-bound hydroxyl end groups, and N,N',N''-tris-(2-hydroxyethyl)-isocyanurate.

4. The process according to claim 1 or 2, wherein binder components (i) and (ii) are present in proportions corresponding to an equivalent ratio of blocked and unblocked isocyanate groups to isocyanate reactive groups of from about 0.5:1 to 1.9:1.

5. The process according to claim 3, wherein binder components (i) and (ii) are present in proportions corresponding to an equivalent ratio of blocked and unblocked isocyanate groups to isocyanate reactive groups of from about 0.5:1 to 1.9:1.

6. The process of claim 1 or 2 wherein said substrate is a metal wire.

7. The process of claim 4 wherein said substrate is a metal wire.

8. The coated substrate produced in accordance with claim 1 or 2.

9. The coated substrate produced in accordance with claim 6.

10. The coated substrate produced in accordance with claim 7.

* * * * *